(12) United States Patent
Whiteside et al.

(10) Patent No.: US 6,997,532 B2
(45) Date of Patent: Feb. 14, 2006

(54) DIGITAL IMAGE PRINTER AND METHOD

(75) Inventors: George D. Whiteside, Lexington, MA (US); Bruce K. Johnson, Elkins, NH (US)

(73) Assignee: Polaroid Corporation, Waltham, MA (US)

( * ) Notice: Subject to any disclaimer, the term of this patent is extended or adjusted under 35 U.S.C. 154(b) by 997 days.

(21) Appl. No.: 09/748,650

(22) Filed: Dec. 22, 2000

(65) Prior Publication Data

US 2002/0080243 A1 Jun. 27, 2002

(51) Int. Cl.
*B41J 2/47* (2006.01)
*B41J 3/00* (2006.01)

(52) U.S. Cl. .......................................... 347/2; 347/241

(58) Field of Classification Search ................ 347/239, 347/241–244, 255, 256–258, 2, 234, 248; 345/698; 353/31; 399/495; 250/559.29; 348/574; 359/472
See application file for complete search history.

(56) References Cited

U.S. PATENT DOCUMENTS

| | | | | |
|---|---|---|---|---|
| 5,689,283 A | * | 11/1997 | Shirochi | 345/698 |
| 5,949,087 A | * | 9/1999 | Cooper | 250/559.29 |
| 6,113,240 A | * | 9/2000 | Iizuka | 353/31 |
| 6,304,381 B1 | * | 10/2001 | Hayashi | 359/495 |

* cited by examiner

*Primary Examiner*—Hai Pham (57) ABSTRACT

The present invention is directed to a digital image printer which incorporates a jogging system for providing an inexpensive printer for improving color saturation when imaging from a digital display which has monochromatic pixels. The device includes a printer having a housing that encloses, in a common cavity thereof, an arrangement including a digital area array display, a plurality of lenses, and an image plane. The digital area array display, the plurality of lenses, and the image plane are spaced along an optical axis extending from the digital area array display through the plurality of lenses, and toward the image plane such that a digital image provided by the display can be brought into focus onto the imaging plane by the plurality of lenses. One of the plurality of lenses is a transposable lens, the transposable lens capable of being transposed out of the optical axis during the operation of the printer, to increase the perceived resolution of the digital image focused onto the imaging plane.

10 Claims, 8 Drawing Sheets

DIGITAL IMAGE PRINTER AND METHOD

BACKGROUND

1. The Field of the Invention

In general, the present invention relates to digital image devices, and more particularly, to a novel means for improving resolution of an image projected from a digital display.

2. Description of the Prior Art

The internet is dramatically changing the way information is created and distributed. The increasing popularity of this worldwide network has led to many new digital products used for a variety of purposes. For example, digital cameras capture images and store them as digital files which may be easily published on a website or instantly sent across the world.

Digital files may also be viewed or imaged using various digital displays, such as microdisplays, spatial light modulators, liquid crystal displays (LCD), organic light emitting diode displays (OLED), or other known types of digital displays. Digital displays are comprised of arrays of pixels which illuminate at various discrete levels. Improving the resolution of the image on the digital display may be obtained by increasing the number of pixels per unit area. Pixels per unit area may also be referred to as dots per inch (dpi).

Some digital displays are comprised of pixels that only illuminate in one color, for example, single color or "monochromatic" pixel displays. Each pixel of a monochromatic pixel display is typically one of three colors, for example, red, green or blue. Furthermore, each row of pixels will have a pattern of alternating pixel colors: red, green, blue, red, green, blue and so on. This system works fine for viewing images on a digital display, but may become a problem with more demanding applications such as printing on large format film. When printing a single color pixel display onto large format films the alternating pixel colors becomes easier to notice to the naked eye. For example, if you are imaging a large red barn form the digital display onto film, then only every fourth pixel of each row illuminates red light, the other green and blue pixels illuminate no light and therefore will image as black areas on film. In effect only ⅓ of the barn will be red, the other ⅔ of the barn will be black.

Thus, a need exists for a means of improving the color quality of an image produced from a single color pixel display.

SUMMARY

The present invention is directed to a digital image printer which incorporates a jogging system for providing an inexpensive means for improving color saturation when imaging from a digital display comprised of monochromatic pixels.

Accordingly, the invention provides in one aspect a printer having a housing that encloses, in a common cavity thereof, an arrangement comprising a digital area array display, a plurality of lenses, and a photosensitive medium. The digital area array display, the plurality of lenses, and the image plane are spaced along an optical axis extending from the digital area array display through the plurality of lenses, and toward the photosensitive medium such that a digital image provided by the display can be brought into focus onto the photosensitive medium by the plurality of lenses. One of the plurality of lenses is a transposable lens, the transposable lens capable of being transposed out of the optical axis during the operation of the printer, said transposable lens moving in incremental lengths equaling the width of one pixel, whereby said printer increases the perceived resolution of the digital image focused onto the photosensitive medium.

In another embodiment, the invention also includes a jogging device for transposing a transposable lens, the device comprising a first translating means for transposing a transposable lens in a first direction, and a second translating means for transposing said transposable lens in a second direction. The jogging device also including a first and second biasing means for aiding in the movements of the transposable lens.

The present invention provides, in another aspect, a method of imaging a digital display onto an image plane, the method comprising the steps of:

a) providing a digital display, a plurality of lenses, and an image plane defined by a photosensitive medium, said digital display, said plurality of lenses, and said photosensitive medium spaced along an optical axis extending from said digital display through said plurality of lenses, and toward said photosensitive medium such that a digital image provided by said display may be brought into focus onto said photosensitive medium by said plurality of lenses, and one of said plurality of lenses is a transposable lens, said transposable lens capable of being transposed out of said optical axis during the operation of said printer;

b) illuminating said digital display with a first digital image data set for a fixed period of time, whereby light from each pixel of said digital display exposes a pixel image on said photosensitive medium, turning off said digital display;

c) transposing for a first time, said transposable lens a fixed distance, said fixed distance being such that each of said pixel images exposed onto said photosensitive medium is shifted by a distance equal to the width of one pixel image;

d) illuminating said digital display, with a first or a second digital image data set, for a second fixed period of time, turning off said digital display;

e) transposing, for a second time, said transposable lens said fixed distance f) illuminating said digital display, with a first or a third digital image data set, for a third fixed period of time, turning off said digital display; and g) whereby said method of imaging increases the perceived resolution of the digital image focused onto said photosensitive medium.

BRIEF DESCRIPTION OF THE DRAWINGS

The above and other features and advantages of this invention will be more readily apparent from a reading of the following detailed description of various aspects of the invention taken in conjunction with the accompanying drawings.

The relative locations, shapes and sizes of objects have been exaggerated to facilitate discussion and presentation herein.

DETAILED DESCRIPTION OF THE PREFERRED EMBODIMENTS

Referring to the figures set forth in the accompanying drawings, the illustrative embodiments of the present invention will be described in detail hereinbelow.

The present invention is a digital image printer which incorporates a jogging system for providing an inexpensive and accurate means for improving color saturation when imaging from a digital display comprised of monochromatic pixels.

Figure 1:
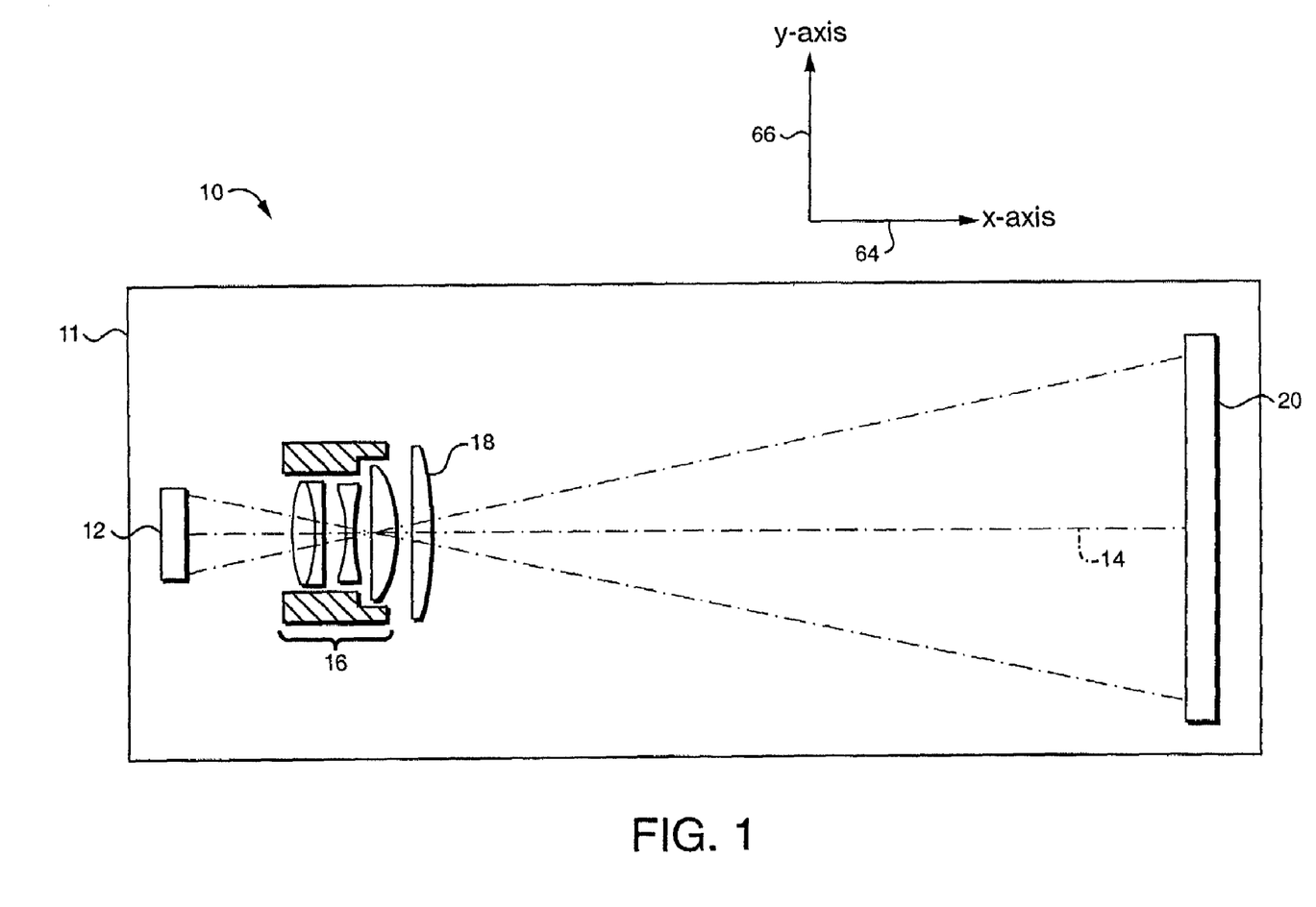
FIG. 1 is a side full-sectional schematic view of an embodiment of the digital image printer of the present invention.

Referring to FIG. 1, the digital printer 10 of the present invention is shown, in a first embodiment, to comprise a housing 11 that encloses, in a common cavity thereof, a digital area array display, or digital display 12, which may be located at one end of said housing 11. A first lens 16, and a transposable lens 18 are also located in the housing 11. The first lens 16 and transposable lens 18 being fixed along an optical axis 14 extending from said digital display 12, through the plurality of lenses, and ending on the image plane comprised of a photosensitive medium 20. The lenses are located between said digital display 12 and said photosensitive medium 20. The housing 11 is designed to be significantly light tight and fabricated of metal, plastic or composite material. Any lightweight and durable material may be used for the housing 11.

The digital display 12 may be a spatial light modulator, a liquid crystal display (LCD), an organic light emitting diode (OLED), a microdisplay, or other digital area array display known in the art. This jogging method may be used on either a transmissive or reflective type digital display. Transmissive displays have low fill factors because they require more structure around each pixel than reflective displays. The quality of an image produced from a digital display typically decreases as the fill factor of the digital display decreases. The lower the fill factor, the lower the amount of area of the display that will transmit light. One of the advantages of the instant invention, is the jogging system reduces some of these problems associated with digital displays having low fill factors. Whether the display is transmissive or reflective, it should be firmly fixed so that the digital display face is substantially parallel to the photosensitive medium 20.

Figure 7A:
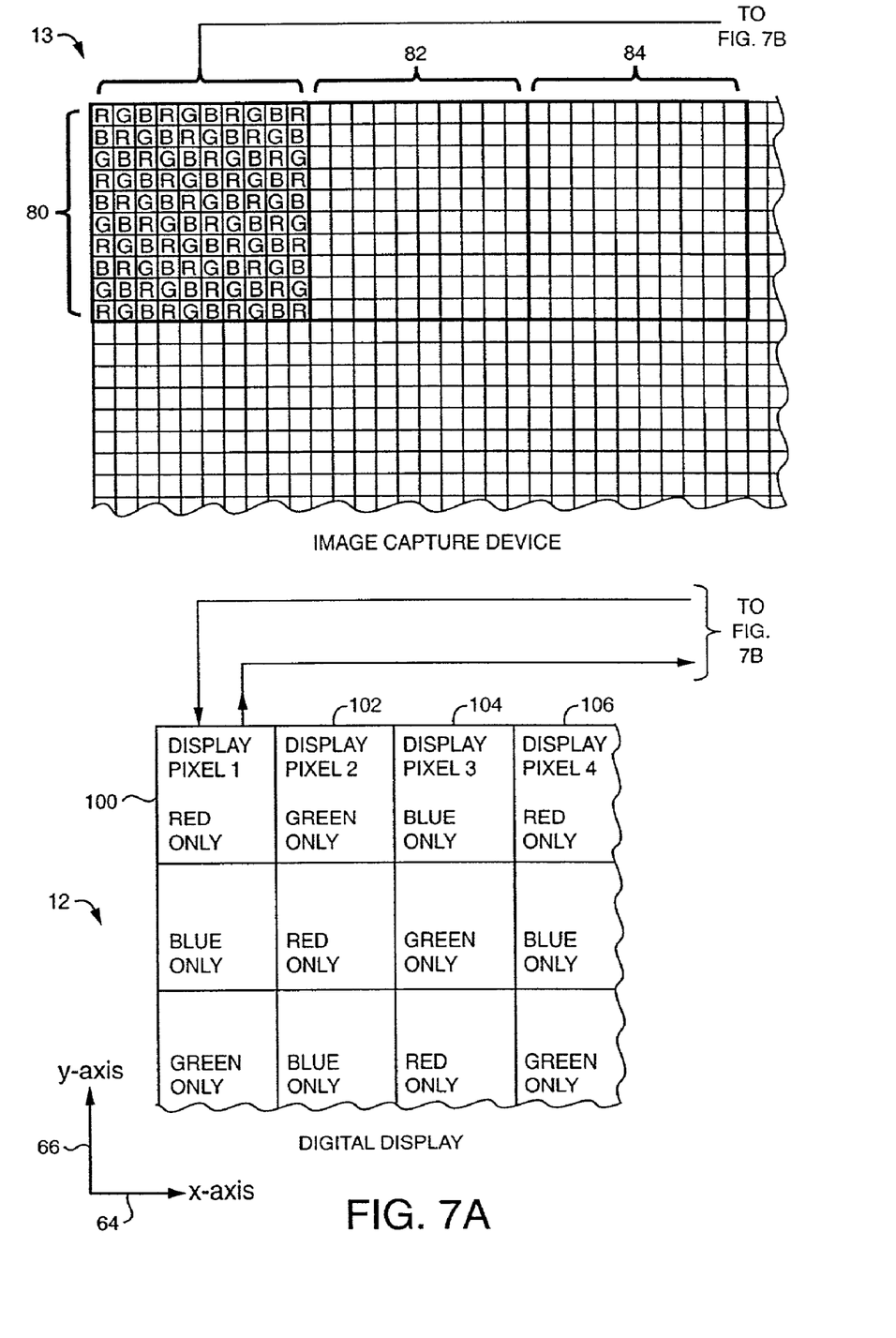
FIG. 7 is a partially broken away front view of one embodiment of an image capture device, digital display, and a photosensitive medium.
Figure 7B:
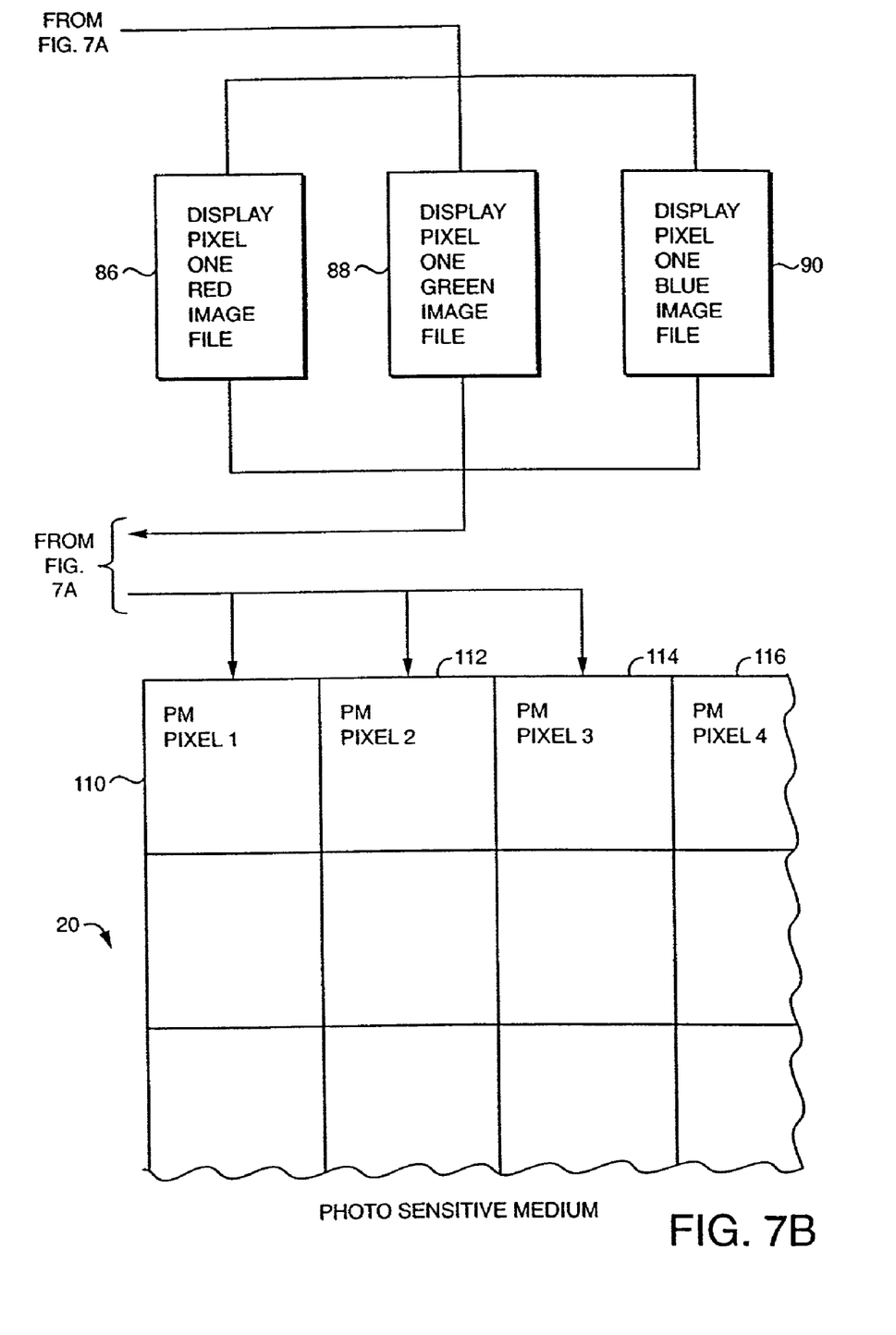

The present invention is designed to improve resolution and color saturation from a digital display comprised of monochromatic pixels. We will define a monochromatic pixel to be a pixel that illuminates light in only one color. A display comprised of these monochromatic pixels will be referred to as a monochromatic pixel display. FIG. 7B illustrates one embodiment of such a display, whereas each pixel illuminates either a red, green or blue light.

As shown in FIG. 1, a first lens 16 is also included in the digital printer 10. This lens's function is for projecting the digital display image onto the image plane which is comprised of a photosensitive medium 20. This first lens 16 is permanently fixed in a position to properly focus the digital display image onto the photosensitive medium 20. Any conventional prime imaging lens may be used for this purpose, for example, an optical projection lens. The first lens 16 is configured to be fixed in a position substantially parallel to the digital display 12, the transposable lens 18 and the photosensitive medium 20. Either plastic or glass lenses may be used in this application. Alternatively, this first lens 16 could be a group of lenses assembled as a prime imaging lens for the printer 10, as shown in FIG. 1.

A transposable lens 18 is also included in the digital printer 10. This transposable lens 18 is part of the jogging system. The transposable lens 18 is coupled with a device to "jog", or transpose, the transposable lens 18 in planer directions substantially perpendicular to the optical axis 14. This system of jogging provides a means for increasing the resolution and for improving the color saturation when printing from a digital display. Any conventional lens may be used for this purpose, for example, a meniscus or plano-convex lens. The first lens 16 is the prime imaging lens and has a higher diopter power than the transposable lens 18. In a first embodiment, the first lens 16 has approximately 20 to 40 times more diopter power than the transposable lens 18. For example, if the first lens 16 has a diopter power of 40, then the transposable lens 18 may have a diopter power of only 1 or 2.

In a first embodiment, the transposable lens 18 is located in between the first lens 16 and the photosensitive medium 20. The first lens 16 may be adjusted to allow for the axial refocus of the projected image that results from placing the weak transposable lens 18 between the first lens 16 and the photosensitive medium 20. In a first embodiment, the system of jogging the transposable lens 18, being 1000 mm, in conjunction with the fixed first lens 16, being 35 mm, de-amplifies the effect of the jog such that the mechanical tolerances required on the jogging device become easy to control.

This weak transposable lens 18 has negligible effect on the optical quality of the image, even if the first lens 16 is designed without including the effects on the image of the weak transposable lens 18. Alternatively, if the transposable lens 18 and the first lens 16 both had a focal length of 35 mm, then even small jogs of the transposable lens 18 would cause large shifts of the image, and therefore requiring small tolerances on the movements of the jogging device.

The photosensitive medium 20 is located substantially parallel to the digital display 12. The first lens 16 is the prime imaging lens that projects the digital image onto the photosensitive medium 20. A photosensitive medium, such as conventional or instant film, may be used to define the image plane and for capturing the image. In the first embodiment, the photosensitive medium 20 is defined by one piece of instant film.

Figure 2:
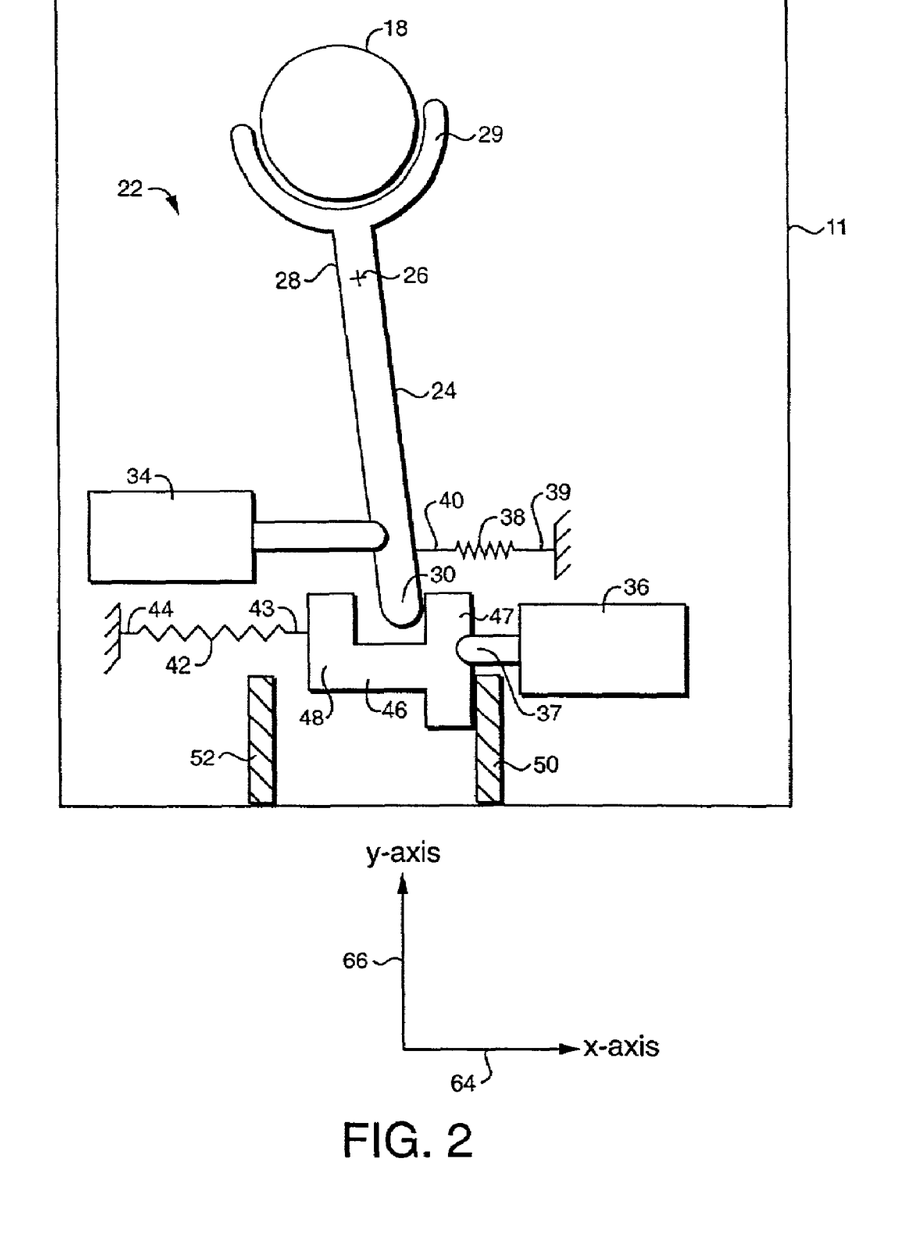
FIG. 2 is a front full sectional view of an embodiment of the jogging device, in a first position, of said digital image printer illustrated in FIG. 1.

A first embodiment of the jogging device 22, is illustrated in FIG. 2, which shows the system in a first position. The jogging device functions to transpose or jog the transposable lens 18 between one of three positions. A first linear motion control device 34 is coupled at its moving end to second end 30 of a lever arm 24. The first linear motion device 34 may be a solenoid or other similar device. The lever arm 24 pivots about a pin 26, the pin 26 is located substantially in the first end area of the lever arm 24. In this first embodiment, the first end 28 also includes a transposable lens frame 29 which secures said transposable lens 18 on its perimeter. The transposable lens frame 29 may either be attached or merely circumjacent to the transposable lens 18. In this first example, the transposable lens frame 29 is designed to contain the transposable lens 18 with a press or interference fit, alternatively, the transposable lens may be mechanically attached to the transposable lens frame with an adhesive or hook and loop arrangement. In a second embodiment, the first end 28 would not be attached to a unshaped frame but rather be a substantially straight member mechanically attached at its end to the perimeter of the transposable lens 18. A first biasing means 38 is permanently fixed at a first biasing means first end 39. The first biasing means second end 40 is attached to the second end 30 of the lever arm 24.

The first embodiment of said jogging device 22 also includes a second linear motion control device 36 being coupled at a second moving end 37, to a member first end 47 of a member 46. The second linear motion device 36 may be a solenoid or other similar device. Both linear motion control devices are permanently fixed so that only the moving ends of the devices are moveable in controlled directions. The member 46 is designed to facilitate the controlled and precise movements of the second end 30 of the lever arm 24. The member second end 48 is coupled with a second biasing means first end 43. The second biasing means 42 is fixed at a second biasing means second end 44. In a first embodiment, the biasing means are springs fabricated from metal, plastic or other suitable material with elastic properties. The jogging device 22 also includes a first stop 50 and a second stop 52 which function to limit the horizontal movement of the member 46.

Figure 3:
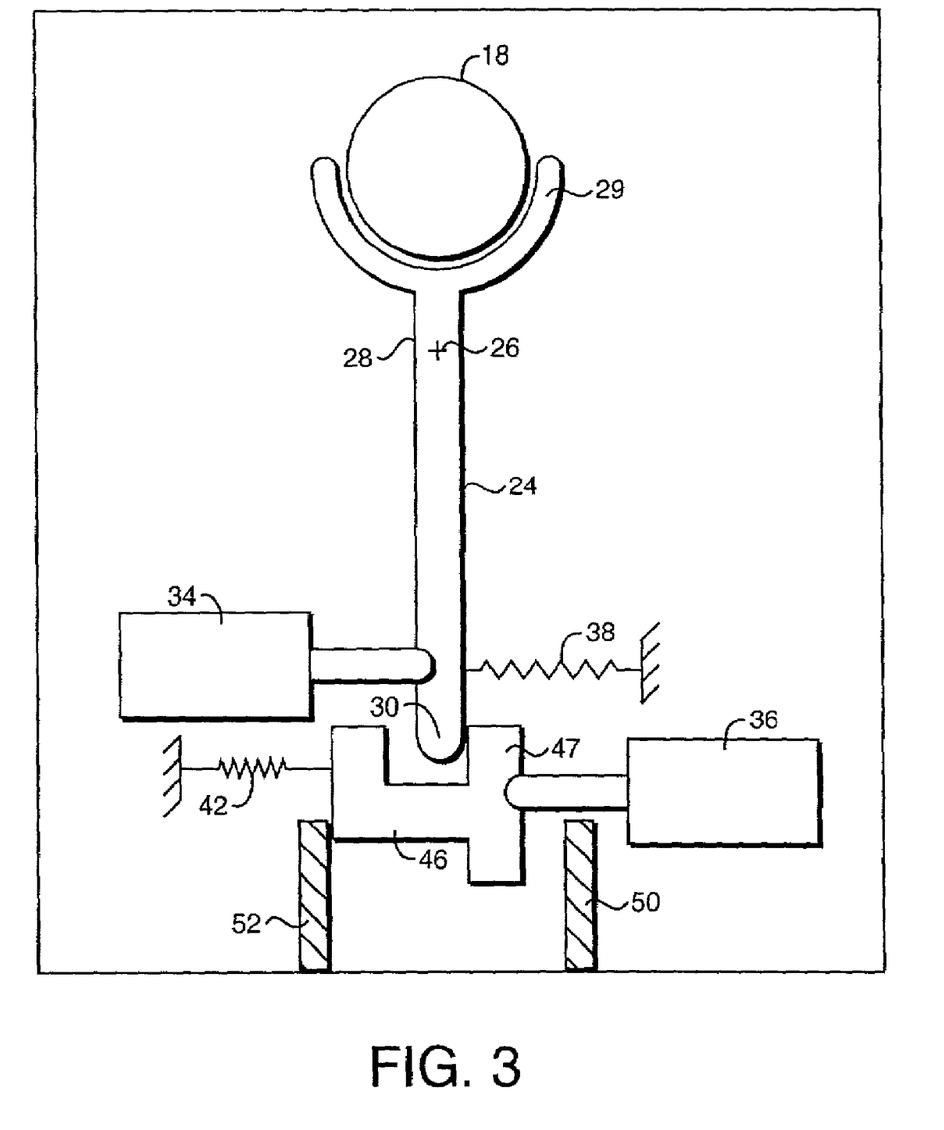
FIG. 3 is a front full sectional view of an embodiment of the jogging device, in a second position, of said digital image printer illustrated in FIG. 1.
Figure 4:
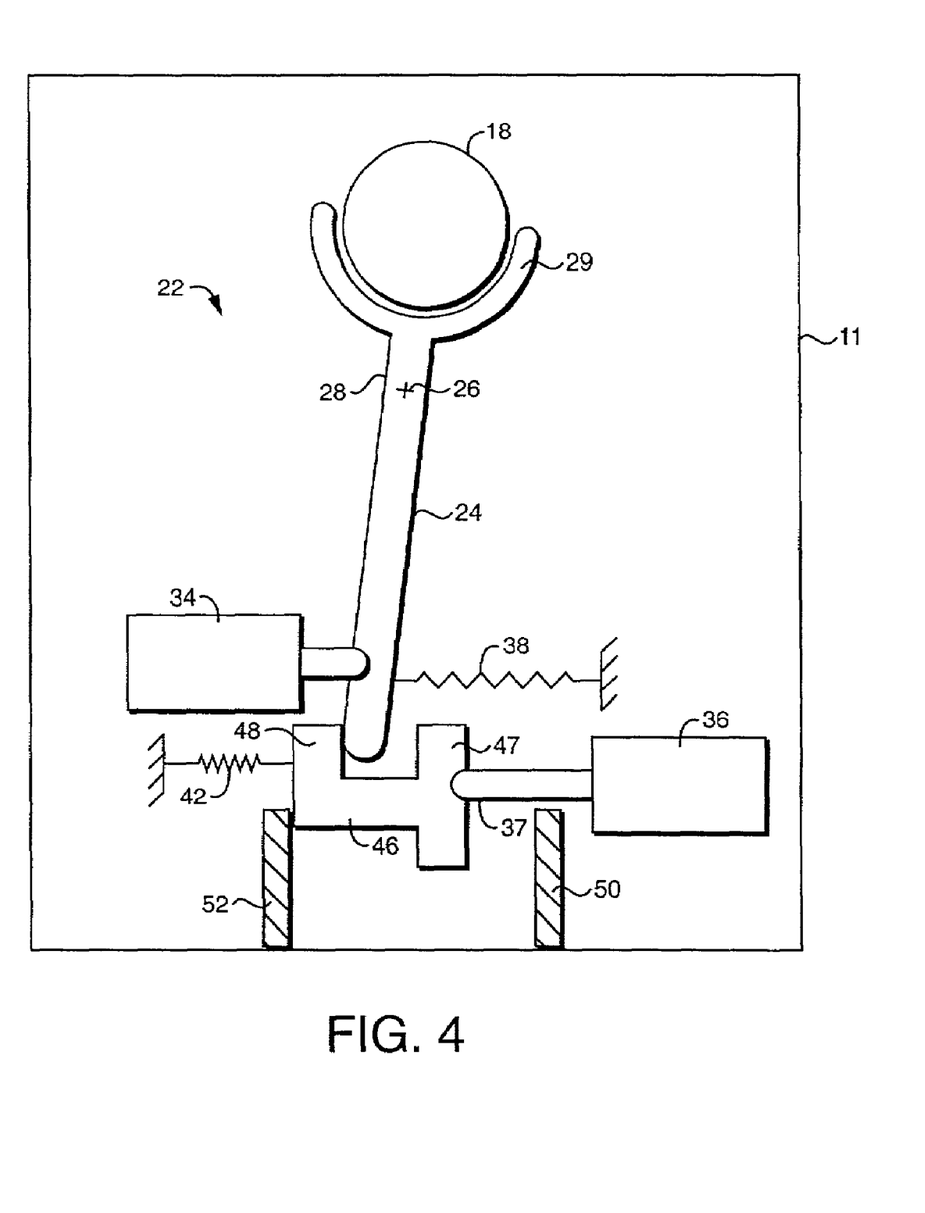
FIG. 4 is a front fill sectional view of an embodiment of the jogging device, in a third position, of said digital image printer illustrated in FIG. 1.

FIGS. 3 and 4 illustrate the respective movement of the parts of the jogging device 22 in the second and third positions of the transposable lens 18. These positions will be discussed in greater detail in the operations section of this specification.

Figure 5:
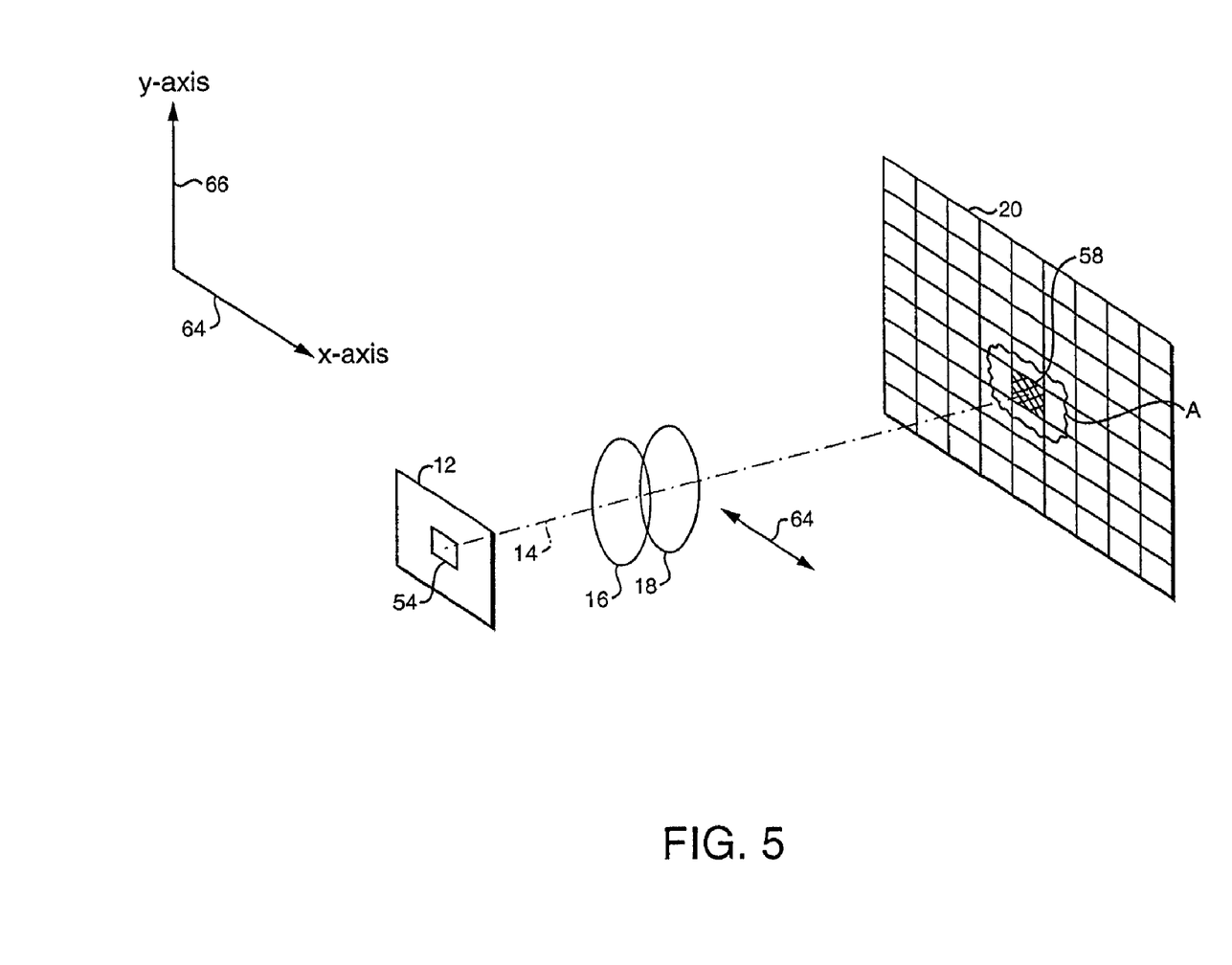
FIG. 5 is an exploded view, similar to that of FIG. 1, of parts of the digital image printer of the present invention.

FIG. 5 shows another partial view of some of the parts of the digital image printer 10. As known in the art, the face of a digital display 12 comprises an array of pixels. However, to clarify our discussion we will initially discuss only one of the digital display's pixels. Therefore, one pixel 54 is shown on the face of the digital display 56. The light from said pixel 54 is projected along an optical axis 14 through the first lens 16 and transposable lens 18 and onto the photosensitive medium 20 at a first pixel imaged location 58. During this jogging process, the image location of display pixel one changes, as will be shown and discussed in a later section pertaining to FIG. 6. The photosensitive medium 20 is divided up into rows and columns to illustrate that the image on said photosensitive medium 20 is derived from the many rows and columns of pixels on the digital display 12. Also shown, the transposable lens 18 may be jogged in various directions, such as the positive or negative x-axis directions 64.

Figure 6:
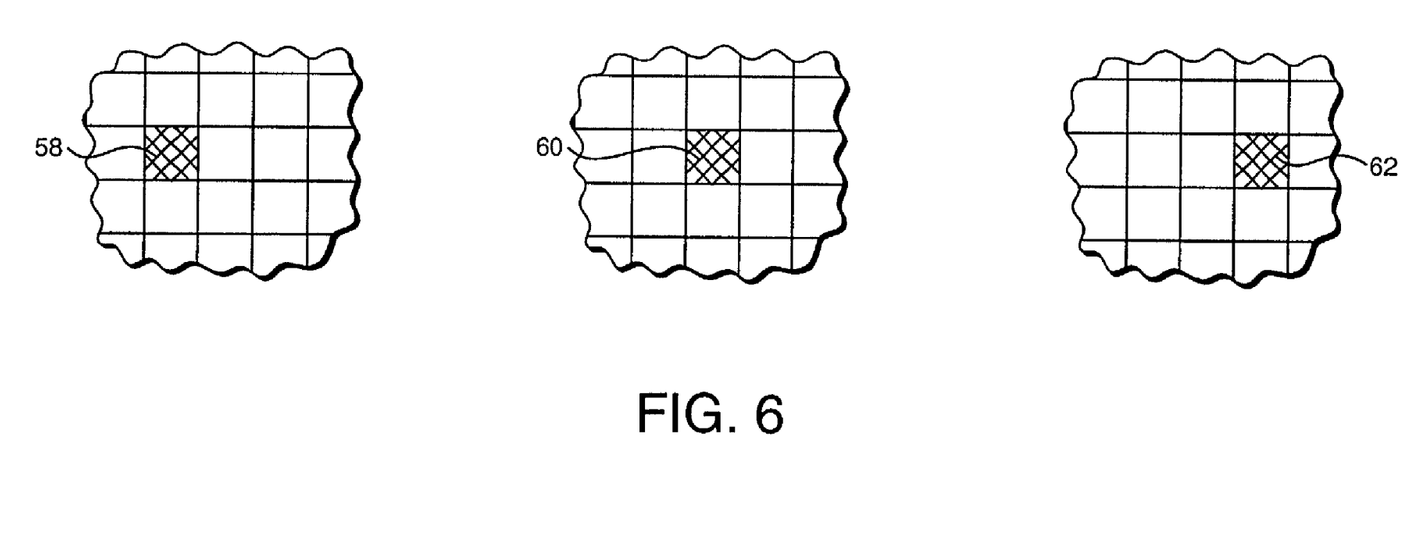
FIG. 6 is a partially broken away front elevational view, illustrating that three separate images are illuminated onto the photosensitive medium from each individual pixel of the digital display.

This jogging process involves three partial exposures of the digital display for each full exposure. The transposable lens 18 is jogged two times during this process, so that each of the three exposures, of a single pixel, is imaged at a different image location on the photosensitive medium. This is illustrated in FIG. 6. The first position of the transposable lens projects the light from this first pixel and produces the first image location 58. Then the transposable lens 18 is jogged so that this same display pixel is now imaged at a second pixel image location 60 on the photosensitive medium. Next, the transposable lens 18 is jogged again so that the same display pixel 54 is imaged at a third pixel image location 62. The transposable lens is jogged in such an amount so that each of these images on the photosensitive medium are substantially side by side.

The Imaging Process—a First Embodiment

In operation, conventional digital printers typically illuminate a digital display 12 and optically project the image onto a photosensitive medium for printing. The instant invention also includes a jogging system for providing an inexpensive means for improving color saturation when imaging from a digital display comprised of monochromatic pixels.

A first step is an image is captured using an image capture device, such as a CMOS or CCD digitally captures an image and stores it in memory as a source file. Typically, the resolution, or number of pixels, of the image capture device will be higher than the resolution of the digital display 12. In this situation, the source file data will be manipulated to match the desired final resolution of the image to be displayed on the digital display. One example of this is illustrated in FIG. 7, the data from a first grouping of image capture device pixels 80 is intelligently combined to provide three image files: a display pixel one red image file 86, a display pixel one green image file 88, and a display pixel one blue image file 90. Each of these red, green and blue sets of image files will be associated with one pixel of the digital display. Similarly, the data from the second grouping of image capture device pixels 82 is combined to provide three image files for display pixel two 102 of the digital display 12. Therefore, each individual display pixel will have a red, green and blue image file associated with it. As illustrated in FIG. 7, display pixel one 100 has the following files associated with it: display pixel one red image file 86, display pixel one green image file 88, and display pixel one blue image file 90. Likewise, display pixel two 102 will also have a red, green and blue image file generated from the data from the second grouping of image capture device pixels 82.

Now we will discuss the system of jogging and which images are displayed on the display during each step of the jog process. For each jog position of the transposable lens 18, each pixel of the digital display 12 exposes a distinct image file. The transposable lens 18 is jogged between three locations, or positions, and the image on the photosensitive medium is fully exposed after three separate partial exposures at each jog position. During the first exposure of this jogging system, each pixel of the digital display is exposed on a specific location of the photosensitive medium. The pixels from the image capture device have been carefully combined to correspond with a specific display pixel. Also, each display pixel's image data must also only be displayed on one pixel area of the photosensitive medium. Therefore, when the transposable lens is jogged, and a display pixel is now being imaged onto a different photosensitive medium pixel, the display must be loaded with an image file corresponding to a different display pixel.

The digital display 12 is comprised of monochromatic pixels, so that each pixel illuminates in only one color. For example, display pixel one 100 illuminates only red light waves. In this first embodiment, during the first partial exposure, the red light illuminating from display pixel one 100 is projected through the lenses and onto the photosensitive medium at the location of photosensitive medium pixel one 10. During this first exposure the green light illuminating from display pixel two 102 is projected through the lenses onto photosensitive medium pixel two 112. Also, during this first exposure the blue light illuminating from display pixel three 104 is projected through the lenses onto photosensitive medium pixel three 114. Likewise, during this first exposure, red light illuminating from display pixel four 106 is projected through the lenses onto photosensitive medium pixel four 116. This pattern repeats itself with every pixel on the digital display, so that each display pixel is imaging either a red, green or blue light onto the photosensitive medium. Now one can understand that if this was the only exposure position, that each individual color can only show up on the photosensitive medium on every third pixel location. So if you were imaging a large red barn, then only one of every third pixel would actually be able to image the color red. This leads to poor color saturation. The jogging system allows you to have a red (or green or blue) image exposed on any of the photosensitive medium pixels, and not just on every third pixel location.

After the first partial exposure with the transposable lens in the first position, the digital display images are powered off. Then the transposable lens is jogged, in the positive x-axis direction, to the second position to prepare for the second partial exposure of the medium. Each jogged distance is substantially equal to the width of one pixel image on the photosensitive medium. For example, the distance of the jog, after the first exposure, being such that display pixel one 100 would now illuminate light onto photosensitive medium pixel two 112.

Then the digital displays are loaded with new image files to correspond with the new photosensitive medium pixel location. For example, during this second exposure the red light illuminating from display pixel one 100 will now be exposed onto photosensitive medium pixel two 112 and not photosensitive medium one 110. Therefore, for the second exposure, display pixel one 100 will be loaded with the red image file that corresponds with display pixel two 102, for this second exposure. In other words, the red light data for this second exposure of display pixel one 100 is taken from the second grouping of image capture device pixels. Similarly, all the other display pixels will also be loaded with different image files, such as display pixel two 102 will be loaded with the green image file that corresponds with display pixel three 104. Although this system has the transposable lens jogging in the positive x-axis 64 directions for both jogs, this same system works if the lens jog in other directions, such as in the negative and then in the positive x-axis directions. Also, this system works if the transposable lens is jogged other non-x-axis directions, such as the y-axis directions.

After this second partial exposure with the transposable lens 18 in the second position, the digital display is powered off again. Then the transposable lens is jogged for a second time to put the transposable lens 18 in a third position. Now the third and last partial exposure will take place. Each display pixel is loaded with a new image file. For example, display pixel one 100 is now loaded with the red image file that corresponds with display pixel three 104. This is done because, with the transposable lens 18 in this third position, the light illuminating from display pixel one will now be imaged onto photosensitive medium pixel three 114.

The duration of each of the three exposures is for a partial amount of the total exposure time of the photosensitive medium, depending on the color being exposed. Different colors expose the photosensitive medium at varying rates, so that each colors exposure may vary, but the total of all three colors exposure times will add up to the total exposure time for the photosensitive medium. The exposure time and illumination rates will vary depending on which type of digital display is used in the system. For example, if you have a digital display with 25% fill factor, each pixel or jog position may require full exposure at full illumination. Alternatively, if the digital display 12 has 100% fill factor, then each pixel or jog position may require only ¼ exposure time at full illumination, or full exposure time at ¼ illumination. A digital display with 100% fill factor gives you four times as much light as a digital display with a 25% fill factor.

The Imaging Process—a Second Embodiment

Now we will discuss the system of jogging and which images are displayed on the display during each step of the jog process during a second embodiment. For each jog position of the transposable lens 18, each pixel of the digital display 12 exposes the same image file. The transposable lens 18 is jogged between three locations, or positions, and the image on the photosensitive medium is fully exposed after three separate partial exposures at each jog position. During the first exposure of this jogging system, each pixel of the digital display is exposed on a specific location of the photosensitive medium.

The digital display 12 is comprised of monochromatic pixels, so that each pixel illuminates in only one color. For example, display pixel one 100 illuminates only red light waves. In this second embodiment, during the first partial exposure, the red light illuminating from display pixel one 100 is projected through the lenses and onto the photosensitive medium at the location of photosensitive medium pixel one 110. During this first exposure the green light illuminating from display pixel two 102 is projected through the lenses onto photosensitive medium pixel two 112. Also, during this first exposure the blue light illuminating from display pixel three 104 is projected through the lenses onto photosensitive medium pixel three 114. Likewise, during this first exposure, red light illuminating from display pixel four 106 is projected through the lenses onto photosensitive medium pixel four 116. This pattern repeats itself with every pixel on the digital display, so that each display pixel is imaging either a red, green or blue light onto the photosensitive medium. Now one can understand that if this was the only exposure position, that each individual color would only show up on the photosensitive medium on every third pixel location. So if you were imaging a large red barn, then only one of every third pixel would actually be able to image the color red. This leads to poor color saturation. The jogging system allows you to have a red (or green or blue) image exposed on any of the photosensitive medium pixels, and not just on every third pixel location.

After the first partial exposure with the transposable lens in the first position, the digital display images are powered off. Then the transposable lens is jogged, in the positive x-axis direction, to the second position to prepare for the second partial exposure of the medium. Each jogged distance is substantially equal to the width of one pixel image on the photosensitive medium. For example, the distance of the jog, after the first exposure, being such that display pixel one 100 would now illuminate light onto photosensitive medium pixel two 112.

Then the digital displays are loaded with the same image files as during the first exposure. Although, the data from the first exposure does not correspond with the new photosensitive medium pixel location, this second exposure will image this new pixel location with a second of the three primary colors. For example, during this second exposure the red light illuminating from display pixel one 100 will now be exposed onto photosensitive medium pixel two 112 and not photosensitive medium one 110. Therefore, for the second exposure, display pixel one 100 will be loaded with the red image file that corresponds with display pixel one 100, for this second exposure. In other words, the red light data for this second exposure of display pixel one 100 is taken from the first grouping of image capture device pixels. Similarly, all the other display pixels will also be loaded with the same image files, such as display pixel two 102 will be loaded with the green image file that corresponds with display pixel two 102. Although this system has the transposable lens jogging in the positive x-axis 64 directions for both jogs, this same system works if the lens jog in other directions, such as in the negative and then in the positive x-axis directions. Also, this system works if the transposable lens is jogged other non-x-axis directions, such as the y-axis directions, for display that have limited color resolution in the y-axis direction.

After this second partial exposure with the transposable lens 18 in the second position, the digital display is powered off again. Then the transposable lens is jogged for a second time to put the transposable lens 18 in a third position. Now the third and last partial exposure will take place. Again, each display pixel is loaded with the same image file. For example, display pixel one 100 is loaded with the red image file that corresponds with display pixel one 100. Similar to the first embodiment, the duration of each of the three exposures is for a partial amount of the total exposure time of the photosensitive medium, depending on the color being exposed.

Although the first embodiment of this imaging process will produce a sharper printed image, this second embodiment may be used on most existing digital devices and would require no manipulation of the devices digital display data. For example, the second embodiment imaging process could be used on a printer that could mechanically attach to the back of a digital camera and would work fine without requiring any electrical communication between the camera and printer. This second embodiment would provide for prints having proper whites because each image location on the print would be able to print any and/or all of the three primary colors: red, green and blue.

Operation of the Jogging Device

The function of the jogging device 22 is to accurately jog the transposable lens between the three positions of the system. The first position of the transposable lens is illustrated in FIG. 2. To accomplish this first position, the first linear motion control device 34 is powered off and it therefore applies no force against the member 46. The second linear motion device 36 is turned on and therefore pulls the second end 30 of the lever arm 24 in the positive x-axis direction 64. This force also pushes the member 46 in the positive x-axis direction 64 until the member first end 47 hits the first stop 50. The lever arm 24 pivots on the pin 26 as it is moved. The force from the first biasing means 38 pulls the second end 30 against the member first end 47. The force of the second biasing means 42 is much less than the force of the second linear motion control device 36. This movement of the second end 30 in the positive x-axis direction 64, causes the lever arm 24 to pivot, and move the transposable lens in the negative x-axis direction 64.

The second position of the transposable lens is illustrated in FIG. 3. To accomplish this second position, the second linear motion control device 36 is powered off and it therefore applies no force against the member 46 or lever arm 24. The first linear motion device 34 is also turned off and therefore applies no force on the lever arm 24. The movement of the lever arm, in this second position is accomplished using only the forces from the biasing means. The force required to extend the first biasing means 38 is less than the force required to extend the second biasing means 42. Therefore, with neither linear motion devices applying any force, the member 46 is pulled in the negative x-axis direction. The second biasing means 42 is sized so it applies enough force to overcome the force of the first biasing means 38 and also to hold the member against the second stop 52. Although the first biasing means applies less force, it nonetheless still applies enough force to pull the second end 30 towards the member first end 47. As shown in FIG. 3, these movements result in the transposable lens 18 aligning to the second position.

The third position of the transposable lens is illustrated in FIG. 4. To accomplish this third position, the second linear motion device 36 is turned off and therefore applies no force on the member 46. The first linear motion control device 34 is powered on and therefore pulls the second end 30 against the member 46 in the negative x-axis direction until the member second end 48 hits the second stop 52. The force of the first linear motion control device 34 is much larger than the resistance force from the first biasing means 38. The second biasing means 42 applies less force than the first linear motion control device 34 and therefore has no effect on the movement of the system in this third position. This movement of the second end 30 in the negative x-axis direction causes the lever arm 24 to pivot, and move the transposable lens 18 in the negative x-axis direction.

The lever arm 24 pivots at such a location, so that movement at the lever arm second end 30 is de-amplified at the first end 28. In one example, moving the linear motion device 36 0.060 inches will move the second end 30 of the lever arm 24.060, but the first end 28 will only move 0.004 inches. The location of the fixed stops, the pin 26, and the length of the lever arm 24 may be easily changed to provide for any desired amount of movement de-amplification. This de-amplification of movement provides for more forgiving tolerances and therefore allows the use of less expensive low force linear motion control devices which result in higher forces at the first end 28 of the lever arm 24.

Alternatively, the jogging device may be comprised of other mechanical linkages, for example, using solenoids and linkages may be used to achieve more lens positions. Alternatively, a cam wheel having multiple steps in conjunction with various linkage arrangements may be used to transpose a lens to many jogged positions. A cam wheel may be powered by a DC motor or stepper motor or other type of motor known in the arts. Also, the first jog step may be in the negative y-axis direction 54 or any other direction. These jogging principles work for any jog directions and/or order of movements.

Some of the Advantages

The instant invention includes a jogging system for providing an inexpensive means for improving color saturation when imaging from a digital display comprised of monochromatic pixels. The following paragraphs describe some of the advantages of this system.

A printer using a monochromatic display without a jogging system has poor color saturation because a solid color can only be imaged using, at best, one third of the pixels of the display showing that color. For example, if you image a red barn with a monochromatic display, then ⅓ of the pixels will be red, but ⅔ of the pixels will print out as black. This does not provide a good red print. In contrast, using the jogging system of the instant invention with a monochromatic digital display, one is able to image any or all of the three primary imaging colors on any pixel of the photosensitive medium. In effect, this jogging system triples the color resolution of the image along the horizontal axis. This provides for proper white colors on the print because each pixel can image red, green and blue.

When you increase the dots per inch (dpi) of each color, or pixels per inch of each color, the resolution and color saturation of the resulting digital image is increased. To obtain a higher resolution of each color from a given digital display, such as a 600×800, one solution is to purchase a digital display 12 having every pixel able to illuminate all three primary colors, but this is expensive. A less expensive means is to use the jogging system of the instant invention to increase the dots per inch of each color. The cost of two small solenoids, a lever and springs are very low; and, these parts are easy to manufacture and inspect. The entire jogging device 22 may be added external to a projection lens, and therefore not affect the internal projection system which typically must be carefully sealed and free from dust, moisture and movement.

Imaging using this jogging system produces a "smoothing" effect on the image, so that there is no discernable pixel structure in the image when viewed under an eye loop. This effect is especially noticeable along an edge, for example, along the edges of a black letter "O" against a white background. Smoothing occurs because the jagged edges or "stair case effect" is minimized by increasing the dpi of each color, which decreases the size of each "jagged edge" or stair, making the edges less noticeable.

If an image capture device, the digital display 12 or the photosensitive medium 20 are jogged, then a very expensive and precise jogging mechanism is required to prevent undesirable rotation of the image on the photosensitive medium 20. However, using a lens as the device 22 eliminates problems associated with rotation during jogging. If the lens is rotated while being jogged, then the image is not affected. Therefore, the jogging device 22 for a lens does not have to be as precise and is therefore less expensive.

If the image capture device, the digital display 12, or the photosensitive medium 20 are jogged, then the device 22 must also be precisely designed to ensure there is accurate and consistent movements of the device. For example, in one specifically sized LCD embodiment, if you desire to jog the image about one pixel, and you are going to jog the first lens 16, you may need to move the first lens 16 about 12 microns, with a tolerance of plus or minus 2 microns. Different sized pixels would change the amount of transposable lens 18 movement required for a movement of one pixel width. In any case, these movements are very small. For example, a human hair is about 100 microns. Therefore, these small movements require sophisticated and expensive equipment to repeatably accomplish these moves. Alternatively, if you desire to jog the image this same distance, but you are going to jog the weaker transposable lens 18, you may need to move the transposable lens 18 about 120 microns. It is easier to repeatably and accurately move a lens 120 microns, using less sophisticated and expensive equipment, than would be required to move a lens 12 microns.

Another reason that this invention may be manufactured inexpensively is that the lever arm/fulcrum design of the jogging device 22 de-amplifies the movements of the control devices, which allows the use of control devices with lower tolerances. For example, if in a certain embodiment, the movement of the first end 28 of the lever arm 24 was de-amplified by approximately 15 times. Then, a linear movement error at the second end 30 of the lever arm 24 of 0.003, may be translated to be only a 0.0002 inch movement at the first end 28 of the lever arm 24 which attaches to the transposable lens 18. Therefore, this lever system is more forgiving of less accurate, and less expensive, linear control device, such as inexpensive solenoids.

Another feature of the instant invention is that the jogging system can image a digital file that has a higher resolution than the digital display 12. In other words, if the digital file has higher resolution than the digital display 12 is able to display at one time, the jogging system of the instant invention enables you to image more of the data, by doing multiple exposures, each with different data.

Another advantage of using the jogging system of the instant invention is that it is a less expensive means of jogging than tipping a plate in the optical path. Although tipping a plate allows for easy to control tolerances, it must be done in a collimated light path. This would require a high quality and expensive telecentric lens system that would have to be located in the telecentric zone between the lens and the imager. Also, this area between the lens and the imager is a dust sensitive area, and moving parts in this area may cause dust problems.

What is claimed is:

1. A method of imaging a digital display onto an image plane, said method comprising the steps of:
    a) providing a digital display, a plurality of lenses, and an image plane defined by a photosensitive medium, said digital display, said plurality of lenses, and said photosensitive medium spaced along an optical axis extending from said digital display through said plurality of lenses, and toward said photosensitive medium such that a digital image provided by said display may be brought into focus onto said photosensitive medium by said plurality of lenses, and one of said plurality of lenses is a transposable lens, said transposable lens capable of being transposed out of said optical axis during the operation of a printer;
    b) illuminating said digital display with a first digital image data set for a fixed period of time, whereby light from each pixel of said digital display exposes a pixel image on said photosensitive medium, turning off said digital display;
    c) transposing for a first time, said transposable lens a fixed distance, said fixed distance being such that each of said pixel images exposed onto said photosensitive medium is shifted by a distance equal to the width of one pixel image;
    d) illuminating said digital display, with a second digital image data set, for a second fixed period of time, turning off said digital display;
    e) transposing, for a second time, said transposable lens said fixed distance;
    f) illuminating said digital display, with a third digital image data set, for a third fixed period of time, turning off said digital display; and
    g) whereby said method of imaging increases the perceived resolution of the digital image focused onto said photosensitive medium.

2. The method of claim 1 wherein each pixel of said digital display is capable of illuminating only one color.

3. The method of claim 1 wherein the movement of said transposable lens for both said transposing for a first time and said transposing for a second time are in a direction along one axis.

4. The method of claim 3 wherein the movement of said transposable lens for both said transposing for a first time and said transposing for a second time are in a direction along one axis and in the same direction.

5. The method of claim 3 wherein the movement of said transposable lens for both said transposing for a first time and said transposing for a second time are in a direction along one axis and in opposite directions.

6. The method of claim 1 wherein said first, second and third fixed periods of time are a portion of said photosensitive medium's total exposure time.

7. The method of claim 1 wherein said digital display is a liquid crystal display.

8. The method of claim 1 wherein said first digital image data set, and said second digital image data set, and said third digital image data set, are all the same digital image data set.

9. A printer having a housing that encloses, in a common cavity thereof, an arrangement comprising a digital area array display, a plurality of lenses, and an image plane onto which a photosensitive medium may be superposed, the arrangement is such that:
   (a) said plurality of lenses are located between said digital area array display and said image plane;
   (b) said digital area array display, said plurality of lenses, and said image plane are spaced along an optical axis extending from said digital area array display through said plurality of lenses, and toward said image plane such that a digital image provided by said display can be brought into focus onto said imaging plane by said plurality of lenses;
   (c) one of said plurality of lenses is a transposable lens, the diopter power of said transposable lens is less than the diopter power of a first lens of said plurality of lenses, an said transposable lens capable of being transposed out of said optical axis during the operation of said printer, said transposable lens moving in incremental lengths equaling the width of one pixel; and
   (d) whereby said printer increases the perceived resolution of the digital image focused onto said imaging plane.

10. The printer of claim 9 wherein each pixel of said digital display illuminates in only one color.

\* \* \* \* \*